(12) United States Patent
Bonato

(10) Patent No.: US 8,534,274 B2
(45) Date of Patent: Sep. 17, 2013

(54) METHOD FOR CALIBRATING SURFACES OF STONE MATERIAL

(75) Inventor: Luca Bonato, Milan (IT)

(73) Assignee: MBD, S.R.L., Malo (IT)

( * ) Notice: Subject to any disclaimer, the term of this patent is extended or adjusted under 35 U.S.C. 154(b) by 0 days.

(21) Appl. No.: 13/306,517

(22) Filed: Nov. 29, 2011

(65) Prior Publication Data

US 2012/0138039 A1    Jun. 7, 2012

Related U.S. Application Data

(63) Continuation of application No. PCT/EP2009/009098, filed on Dec. 10, 2009.

(30) Foreign Application Priority Data

May 29, 2009  (EP) .................................. 09425212

(51) Int. Cl.
*B28D 1/18* (2006.01)

(52) U.S. Cl.
USPC ............. 125/4; 125/3; 125/8; 125/12; 125/35

(58) Field of Classification Search
USPC ................. 125/4, 3, 8, 12, 35; 451/57, 65, 451/66, 5, 336, 110, 213
See application file for complete search history.

(56) References Cited

U.S. PATENT DOCUMENTS

| | | | | |
|---|---|---|---|---|
| 2,070,944 | A  * | 2/1937 | Hillix | 451/28 |
| 4,078,905 | A  * | 3/1978 | Oya | 451/57 |
| 5,022,193 | A  * | 6/1991 | Toncelli | 451/41 |
| 5,056,272 | A  * | 10/1991 | Battaglia | 451/41 |
| 6,106,388 | A  * | 8/2000 | Green | 451/297 |
| 6,315,799 | B1 * | 11/2001 | Toniolo | 451/65 |
| 6,533,648 | B2 * | 3/2003 | Drees | 451/182 |
| 6,645,043 | B1 * | 11/2003 | Yenawine | 451/5 |
| 6,783,443 | B2 * | 8/2004 | Pedrini | 451/167 |
| 7,503,832 | B1 * | 3/2009 | Chang | 451/11 |
| 2002/0061712 | A1* | 5/2002 | Gariglio | 451/5 |
| 2003/0045208 | A1* | 3/2003 | Neidrich et al. | 451/8 |

\* cited by examiner

*Primary Examiner* — George Nguyen
(74) *Attorney, Agent, or Firm* — Fleit Gibbons Gutman Bongini & Bianco PL; Stephen Bongini

(57) ABSTRACT

A method and a plant are provided for calibrating surfaces of stone materials, suitable for working at least one slab (1) composed of an entry side and an exit side and of two parallel side edges; the slab (1) is pushed along the side edges through a conveyor belt and is subjected to the cutting action imparted by multiple tools equipped with a peripheral speed compatible with optimum cutting parameters for the stone material; the tools move along a predefined path along the surface of the slab (1), and the motion imparted by the conveyor belt and the predefined tool path is combined in order to completely cover the surface of the slab (1); the contact between the slab (1) and the tools is ensured simultaneously at least in one point on each of the two side edges of the slab (1).

18 Claims, 4 Drawing Sheets

METHOD FOR CALIBRATING SURFACES OF STONE MATERIAL

CROSS-REFERENCE TO RELATED APPLICATIONS

This application is a continuation of International Application No. PCT/EP2009/009098, filed Dec. 10, 2009, which is based upon and claims priority from prior European Patent Application No. EP09425212, filed May 29, 2009. The entire disclosures of these prior applications are herein incorporated by reference.

BACKGROUND OF THE INVENTION

1. Field of the Invention

The present invention relates to a method for calibrating surfaces of stone materials, ceramics, marble, granite.

2. Description of Related Art

A method for calibrating surfaces of stone materials is classified into the following International Patent Classes (IPC): B24B—MACHINES, DEVICES, OR PROCESSES FOR GRINDING OR POLISHING; B28D—WORKING STONE OR STONE-LIKE MATERIALS.

The prior art in calibrating the surfaces of stone materials is given by:

DE4209273, which discloses a method for calibrating surfaces of stone materials and a plant for calibrating slabs of stone material according to the preamble of the relevant Claims. Such a prior document discloses a head with spindles which works on two sides of a slab of stone material not simultaneously, but in a sequence, due to the transverse movement of the cross-member to which it is rigidly connected, thereby providing a head with reduced sizes. Moreover, the head of this prior art document comprises spindles mechanically connected to the central drive shaft, and motored through such shaft.

U.S. Pat. No. 6,783,443: "Polishing machine for stone materials, having multiple grinding heads aligned on two oscillating and parallel beams with variable offset", in which a machine is disclosed for calibrating stone material comprising a belt conveying the slabs to be calibrated, a pair of beams oscillating along a transverse direction to the conveyor belt motion and respectively supporting a row of calibrating heads, the oscillating beams being arranged at a mutual distance that can be modified.

U.S. Pat. No. 5,056,272: "Method and apparatus for reducing thickness of stone slabs", in which a machine is disclosed for calibrating the thickness of a slab of stone material through two sets of coaxial discs having the same diameter and respectively arranged along two parallel axes arranged transversally to the advancement direction of the conveyor belt of the slabs of stone material.

U.S. Pat. No. 5,022,193: "Method of automatically gauging articles of granite, hard stones and the like of desired thickness, with discontinuous motion", in which a method is disclosed for calibrating slabs of stone material advancing through a conveyor belt and subjected to the action of a spindle comprising a diamond tool, the spindle being able to invert the movement direction according to a trajectory in an orthogonal direction to the belt for advancing the slab, the slab advancing discontinuously and being calibrated, when it is not moving, through a transverse movement of the spindle which covers a first section of slab, then, by stopping the calibration and advancing the slab by a distance equal to the width of the first calibrated section, repeating the procedure for the following slab sections.

U.S. Pat. No. 4,914,870: "Process for automatically smoothing and polishing slabs or marble, granite, stones and the like", in which a method is disclosed for calibrating stone material comprising a system for checking the advancement of the belt for transporting the slab, characterized in that the slab advancement occurs discontinuously and, with an unmoving slab, the beam for supporting the tool-holder spindles performs the transverse motion by calibrating a first slab area for all its width, repeating the procedure for following sections of the slab.

The prior art substantially takes into account:

the continuous calibration by means of a spindle supporting a cylindrical tool whose extension is greater than or equal to the maximum slab width, rotating along a fixed axle parallel to the slab plane and orthogonal to the slab advancement direction. The continuous slab advancement, coupled with the spindle rotation, produces a cutting edge, namely a partitioning line between the calibrated surface and the rough surface that must be calibrated, which covers the whole slab width and advances with the advancement of the slab itself. Approaching the tool with respect to the slab surface occurs by cutting, namely along a direction parallel to the slab surface. For this reason, the continuous calibration works "with position";

the intermittent calibration through a spindle supporting a tool rotating along an orthogonal axis to the slab plane and translating along a transverse direction to the slab advancement direction. Coupling of transverse translation and rotation around its own axis for the tool-holder spindle, produces a cutting edge which does not cover the slab width, but only a part of it. Approaching the tool with respect to the slab surface occurs through pressure, namely along an orthogonal direction to the slab surface. Due to this, the intermittent calibration works "with pressure".

The continuous calibration has the advantage of making a cutting edge coinciding with the slab width. It also has the disadvantage of having to have available a supporting structure for the cylindrical tool with high stiffness and therefore with big sizes in order to ensure the uniform slab calibration. Since the slab reaction force, subjected to the distributed action of the cylindrical tool, is maximum at its center, where the cylindrical tool is more inflected, the continuous calibration by means of a transverse cylindrical tool is: efficient along slab edges, namely next to supporting bushes for the cylindrical tool; scarce along the slab center-distance, namely at half the cylindrical tool height.

The intermittent calibration has the advantage of making the tool better suited to the slab profile due to the fact that the cutting edge does not completely cover the beam width. This allows adopting a slim, not necessarily stiff machine structure.

A problem, occurred in these years, deals with the difficulty of obtaining calibrated slabs and complying with always more and more accurate dimensional tolerances.

It is known that the slab, usually coming from sawing by means of blades or from sawing by means of multi-wire frames, has a surface with a high central concavity. In the '90s, it has been deemed advantageous to calibrate the slab by keeping the slab profile concave; this implied making a product with a high degree of surface finish but, at the same time, provided with a strong geometric irregularity.

In spite of the fact that keeping the slab concavity allows reducing waste to be disposed of, due to the lower amount of removed material, nowadays the market requires more accuracy coupled with an extreme brightness quality of the worked material.

The intermittent slab advancement, coupled with the transverse movement of the tool-holder spindle, allows obtaining slabs with high aesthetic qualities, but low geometric accuracy.

Therefore, the calibration with intermittent advancement is not able to satisfy the dimensional requirement required by the marked.

SUMMARY OF THE INVENTION

An object of the present invention is solving the above prior art problems, by providing a method for calibrating slabs of stone material capable of satisfying both requirements—geometric accuracy and aesthetic qualities.

This is a combination of the continuous advancement motion of the slab with the continuous transverse motion of the tool, so that the contact between slab and tool occurs simultaneously in at least two points, respectively placed in the surface position adjacent to the slab side edges.

The above and other objects and advantages of the invention, as will result from the following description, are obtained with a method as described in claim 1. Preferred embodiments and non-trivial variations of the present invention are the subject matter of the dependent claims.

It will be immediately obvious that numerous variations and modifications (for example related to shape, sizes, arrangements and parts with equivalent functionality) can be made to what is described, without departing from the scope of the invention as appears from the enclosed claims.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

The present invention will be better described by some preferred embodiments thereof, provided as a non-limiting example, with reference to the enclosed drawings, in which.

DETAILED DESCRIPTION

Figure 1:
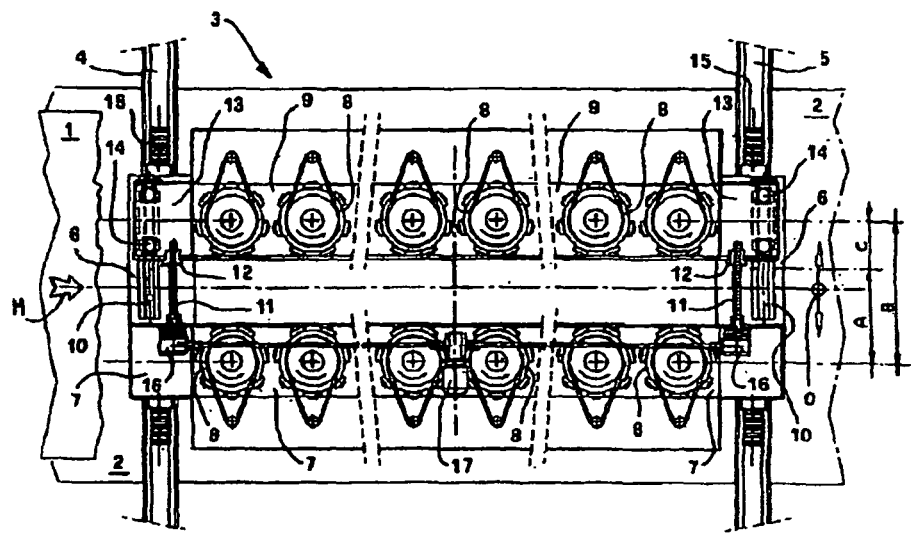
FIG. 1: first reference to prior art for the intermittent calibration method.
Figure 2:
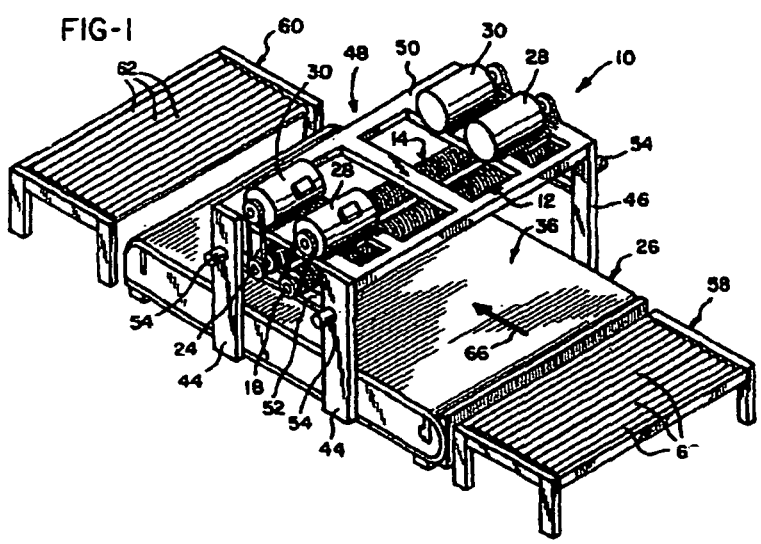
FIG. 2: reference to prior art for the continuous calibration method.
Figure 3:
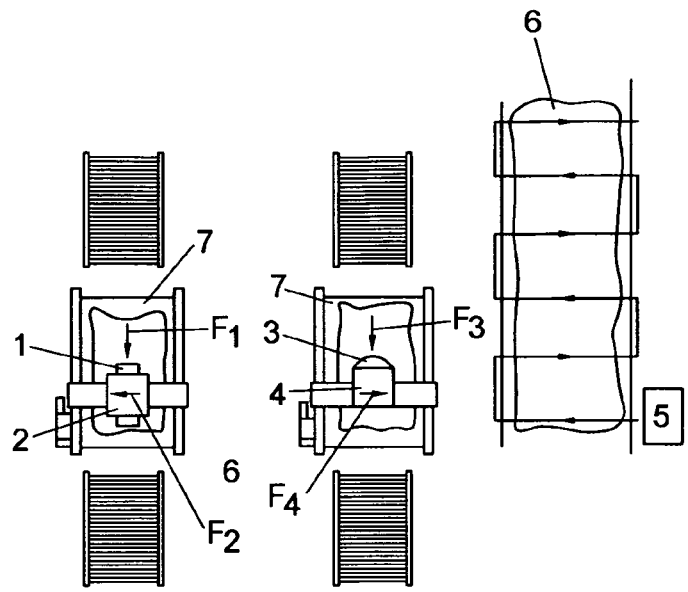
FIG. 3: second reference to prior art for the intermittent calibration method.
Figure 4:
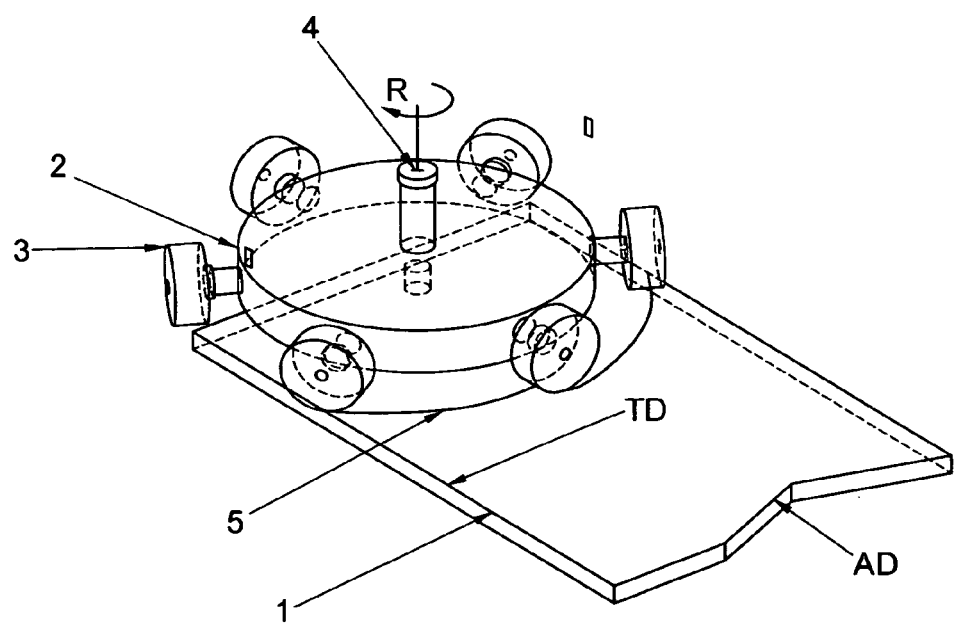
FIG. 4: axonometric view of the slab entry side for the application of the described calibrating method.

An application of the calibrating method of the present invention comprises a slab 1 of stone material, with indefinite length and width H, continuously advancing along direction AD. A head 2, whose maximum diameter is D, supports a series of tool-holder spindles 3 radially arranged at the same distance from the rotation center R and with the same angular pitch. The tools have a cylindrical shape, a circular base with diameter d and a cylinder height h. The head 2 rotates with continuity with respect to the fixed axis of a shaft 4 perpendicular to the slab 1 surface; the tool-holder spindles 3 rotate at a speed corresponding to the peripheral cutting speed Vp compatible with the characteristics of the slab material to be calibrated.

According to one of the features of the present invention, each one of the tool-holder spindles 3 is connected to a coaxial electric motor (not shown), which operates independently from the other motors of the other spindles 3. This is due to the fact that, differently from the prior art (ex. DE4209273), it would be impossible to mechanically connect the spindles 3 on a head with a diameter of 2 or 3 m.

Also differently from the prior art (ex. DE4209273), all working tool-holder spindles 3 simultaneously press on the lateral edges of the slab 1 to be worked.

The mathematical relationship between geometric variables of slab 1, head 2 and tool-holder spindles 3 and between production variables of advancing speed AD, angular rotation speed R of the head 2 is defined by the following expressions:

$$AD(m/min)*\Delta t(sec)*1000/60=h(mm);$$

$$\alpha(RAD)=2*\pi*n(RPM)/60*\Delta t(sec);$$

where:

$\alpha(RAD)$=angular rotation section of which the tool-holder spindle 3-3 moves to reach the position at the center-distance of the slab 1;

$\Delta t(sec)$=time interval passed by the head 2 for moving along the section $\alpha(RAD)$;

n(RPM)=rotation speed of head 2;

h(mm)=tool height integral with tool-holder spindle 3.

By setting:

$\alpha(RAD)$=1.05 corresponding to a head 2 supporting six tool-holder spindles 3 at the same distance;

AD(m/min)=2 m/min;

h(mm)=50 mm;

the following are obtained:

$\Delta t(sec)$=1.5 sec;

n(RPM)=6.68 RPM.

Having set the number of tool-holder spindles 3, radially arranged along a circumference D of the head 2, the minimum width H of the slab 1, capable of ensuring the slab-tool contact in at least two points adjacent to the respective side edges of the slab 1, can be deduced from: H(mm)=D(mm)*sen $\alpha(RAD)$.

For:

$\alpha(RAD)$=1.05 corresponding to six spindles;

and

D(mm)=2300 mm the following is obtained:

Hmin(mm)=2300*0.87=1992 mm.

To be able to calibrate slabs with a reduced width H, it is necessary to increase the number of tool-holder spindles 3.

For example, for:

$\alpha(RAD)$=0.26 corresponding to 24 tool-holder spindles 3 at the same distance;

with:

D(mm)=2300 mm;

the following is obtained:

$$H_{min}(mm) = 2300 * sen(0.26) = 595 \text{ mm}.$$

The above stated mathematical relationships rule the design of an application capable of guaranteeing the simultaneous slab-tool contact in at least two points adjacent to the side edges of the slab 1.

Figure 5:
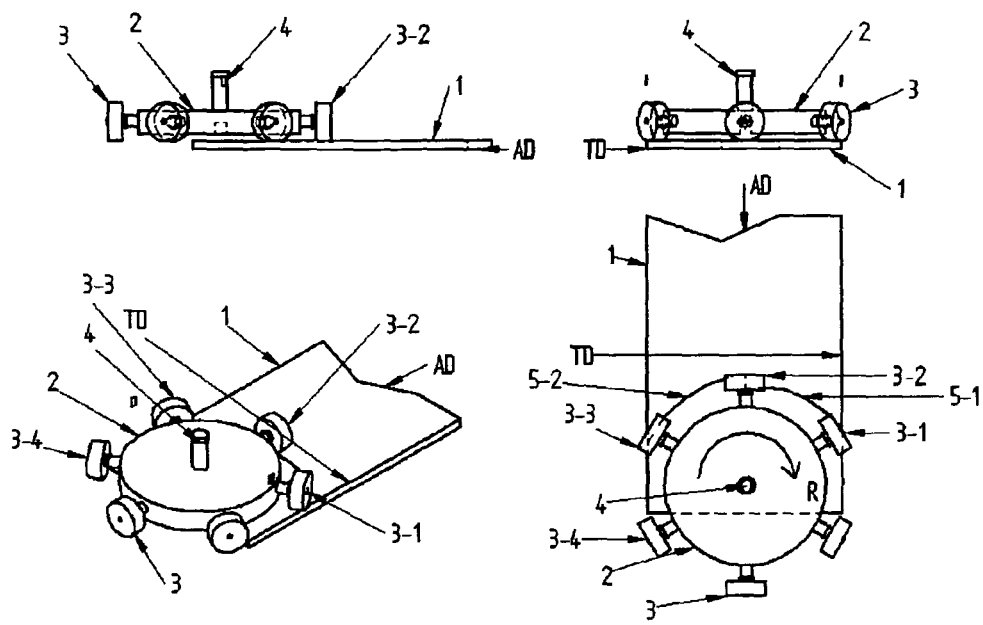
FIG. 5: side, front, axonometric and plan views of the application of the calibrating method in the phase with maximum slab-tool contact.

According to such method, the cutting edge advances along the slab due to the effect of the sum of the following front sections (FIG. 5):

a cutting edge section 5-1, on which the tool moves integral with the spindle 3-1 and adjacent to the right edge of the slab 1;

a cutting edge section 5-2, on which the tool moves integral with the spindle 3-2 and adjacent to the left edge of the slab 1.

Figure 6:
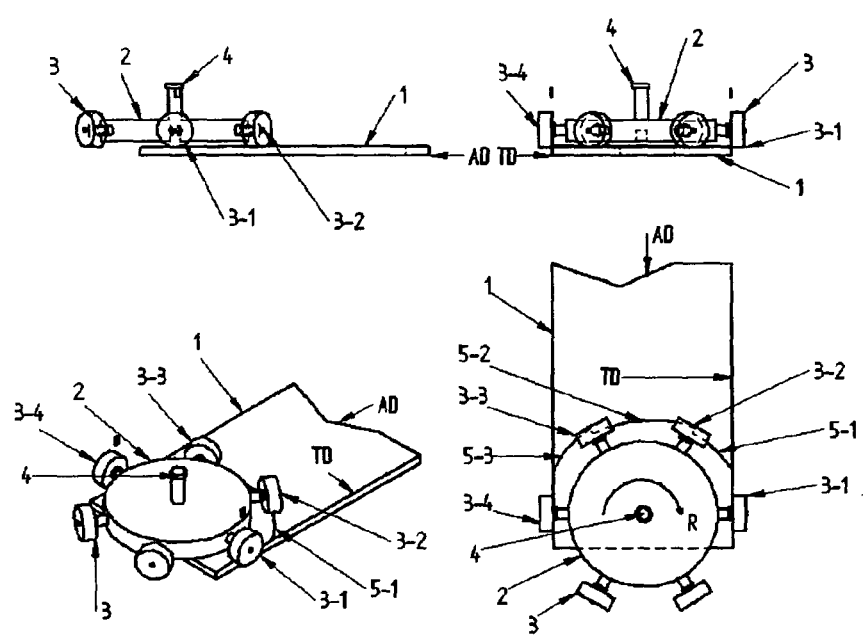
FIG. 6: side, front, axonometric and plan views of the application of the calibrating method in the phase with minimum slab-tool contact.

In a following step, the edge is composed of (FIG. 6):

a cutting edge section 5-1, on which the tool moves integral with the spindle 3-1 and adjacent to the right edge of the slab 1;

a cutting edge section 5-2, on which the tool moves integral with the spindle 3-2 and adjacent to the right edge of the slab 1;

a cutting edge section 5-3, on which the tool moves integral with the spindle 3-3 and adjacent to the left edge of the slab 1.

Figure 7:
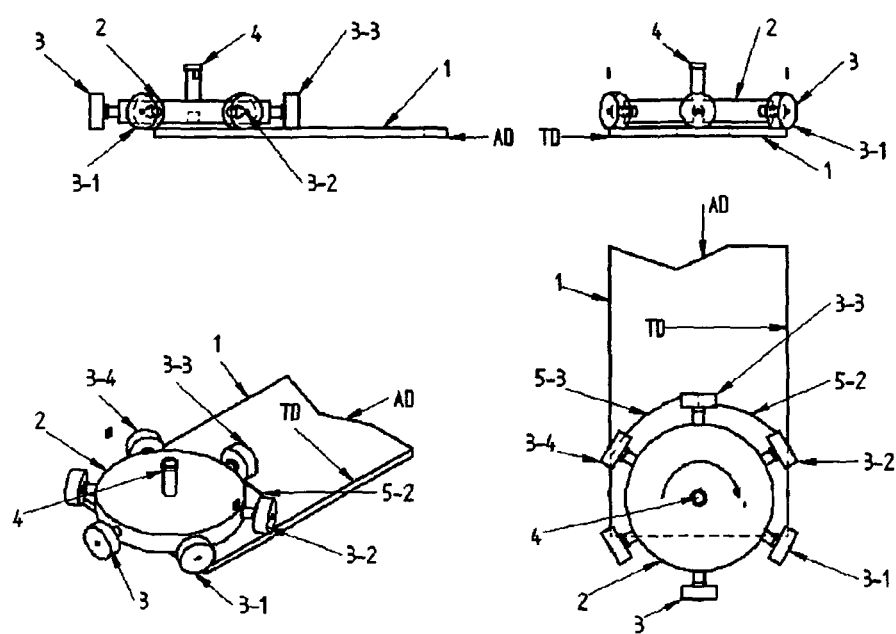
FIG. 7: side, front, axonometric and plan views of the application of the calibrating method in the following phase with maximum slab-tool contact.

In a further phase, the edge is composed of (FIG. 7):

a cutting edge section 5-2, on which the tool moves integral with the spindle 3-2 and adjacent to the right edge of the slab 1;

a cutting edge section 5-3, on which the tool moves integral with the spindle 3-3 and adjacent to the left edge of the slab 1.

The cycle goes on by repeating the advancement sequence of the cutting edge due to the remaining tool-holder spindles arranged along the circumference of the head 2.

The polishing method of the present invention obtains the aim of balancing the cutting forces through at least two slab-tool contacts, the pair of contacts being distributed so that the slab does not oscillate when rolling onto its own concave bottom. This method can then be used for reaching a high standard of dimensional accuracy of the slab thickness, starting from surfaces with concavity defects causes by cutting with blade-type and/or multi-wire frames.

The application of this method on polishing machines for stone material allows:

removing the oscillating plane characteristic of intermittent calibration;

simplifying the construction;

improving the working accuracy standard; in particular, it is possible to work thicknesses down to a minimum of 3 mm;

reducing the noise emitted by the machine and energy consumptions: these are some of the peculiarities of a plant made according to the method described in this document.

The continuous advancement of the slab of stone material in fact allows increasing the working speed and at the same time reducing the energy consumption.

Moreover, the calibrating method of the invention allows using a head with big sizes, which needs a reduced number of radial spindles 3 to work wide slabs, and a high number of radial spindles 3 to work narrow slabs.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for calibrating surfaces of stone materials, suitable for working at least one slab of stone material composed of an entry side and an exit side and of two parallel side edges, the method comprising:

pushing the slab along the two parallel side edges through a conveyor belt so as to continuously advance the slab; and during the pushing of the slab, subjecting the slab to the cutting action imparted by multiple tools, each of the tools moving along a predefined path along a surface of the slab, wherein the continuous advancement of the slab imparted by the conveyor belt and the predefined path of each of the tools combine so that the cutting action of the tools is imparted on the whole surface of the slab, and wherein the contact between the slab and the tools is performed simultaneously in at least two points adjacent to the two parallel side edges of the slab.

2. The method of claim 1, wherein the tools comprise a series of tool-holder spindles, and when a distance between the two parallel side edges of the slab increases, a number of tool-holder spindles, necessary to guarantee simultaneous contact between the slab and the tools in at least two points adjacent to the two parallel side edges of the slab, decreases.

3. The method of claim 1, wherein the simultaneous contact between the slab and the tools in at least of two points adjacent to the two parallel side edges of the slab gives stability to the slab when the slab is uneven or not perfectly plane or has a concave bottom.

4. The method of claim 1, wherein both advancement of the slab and a transverse motion of the tools are of a continuous type, and the combination of the continuous advancement of the slab and the continuous transverse motion of the tools is such that the tools completely cover the whole surface of the slab of stone material.

5. A machine for calibrating a slab of stone material the slab of stone material including an entry side and an exit side and two parallel side edges, the machine comprising:

at least one head, the head continuously rotating with respect to a fixed axis perpendicular to a surface of a the slab;

a series of tool-holder spindles supported by the head and radially arranged along a circumference of the head, the tool-holder spindles each holding a tool so as to subject the slab to a cutting action imparted by multiple tools, each of the tools moving along a predefined path along a surface of the slab;

a conveyor belt continuously advancing the slab, wherein the continuous advancement of the slab imparted by the conveyor belt and the predefined path of each of the tools combine so that the cutting action of the tools is imparted on the whole surface of the slab, and at least two of the tools simultaneously contact the slab in at least two points adjacent to the two parallel side edges of the slab.

6. The machine of claim 5, wherein the series of tool-holder spindles comprises 24 tool-holder spindles for working a slab having its two parallel side edges at a distance of at least about 600 mm.

7. The method of claim 1, wherein each of the tools has a peripheral cutting speed that is compatible with characteristics for the stone material of the slab.

8. The method of claim 1, wherein the tools comprise a head supporting a series of tool-holder spindles radially arranged at the same distance from a rotation center of the head.

9. The method of claim 8,
wherein the head rotates with continuity with respect to a fixed axis perpendicular to the surface of the slab, and
the tool-holder spindles rotate at a speed corresponding to a peripheral cutting speed that is compatible with characteristics of the stone material of the slab.

10. The method of claim 8,
wherein the head rotates with continuity with respect to a fixed axis perpendicular to the surface of the slab, and
the tool-holder spindles rotate, each of the tool-holder spindles rotating independently of the other tool-holder spindles.

11. The method of claim 8,
wherein an advancing speed AD and angular rotation speed R of the head are defined as:

$$AD(m/min) * \Delta t(sec) * 1000/60 = h(mm), \text{ and}$$

$$\alpha(RAD) = 2 * \pi * n(RPM)/60 * \Delta t(sec),$$

where $\alpha(RAD)$ is an angular rotation section of which the tool-holder spindle moves to reach a position at a center-distance of the slab,
$\Delta t(sec)$ is a time interval passed by the head for moving along the section $\alpha(RAD)$,
n(RPM) is a rotation speed of the head, and
h(mm) is a tool height integral with the tool-holder spindle.

12. The method of claim 11,
wherein the tool-holder spindles are arranged along a circumference D of the head, and
a minimum width H of the slab that ensures simultaneous contact between the slab and the tools in at least two points adjacent to the two parallel side edges of the slab is given by:

$$H(mm) = D(mm) * sen\alpha(RAD).$$

13. The machine of claim 5, wherein each of the tool-holder spindles is connected to an electric motor, each of the electric motors operating independently of the other electric motors.

14. The machine of claim 5, wherein, when a distance between the two parallel side edges of the slab increases, a number of tool-holder spindles, necessary to guarantee simultaneous contact between the slab and the tools in at least two points adjacent to the two parallel side edges of the slab, decreases.

15. The machine of claim 5,
wherein a transverse motion of the tools are of a continuous type, and
the combination of the continuous advancement of the slab and the continuous transverse motion of the tools is such that the tools completely cover the whole surface of the slab of stone material.

16. The machine of claim 5, wherein each of the tools has a peripheral cutting speed that is compatible with characteristics for the stone material of the slab.

17. The machine of claim 5,
wherein an advancing speed AD and angular rotation speed R of the head are defined as:

$$AD(m/min) * \Delta t(sec) * 1000/60 = h(mm), \text{ and}$$

$$\alpha(RAD) = 2 * \pi * n(RPM) / 60 * \Delta t(sec),$$

where $\alpha(RAD)$ is an angular rotation section of which the tool-holder spindle moves to reach a position at a center-distance of the slab,
$\Delta t(sec)$ is a time interval passed by the head for moving along the section $\alpha(RAD)$,
n(RPM) is a rotation speed of the head, and
h(mm) is a tool height integral with the tool-holder spindle.

18. The machine of claim 17,
wherein the tool-holder spindles are arranged along a circumference D of the head, and
a minimum width H of the slab that ensures simultaneous contact between the slab and the tools in at least two points adjacent to the two parallel side edges of the slab is given by:

$$H(mm) = D(mm) * sen \alpha(RAD).$$

* * * * *